(No Model.)
W. W. DUNLAP.
ELECTRIC BELT.
No. 363,886. Patented May 31, 1887.
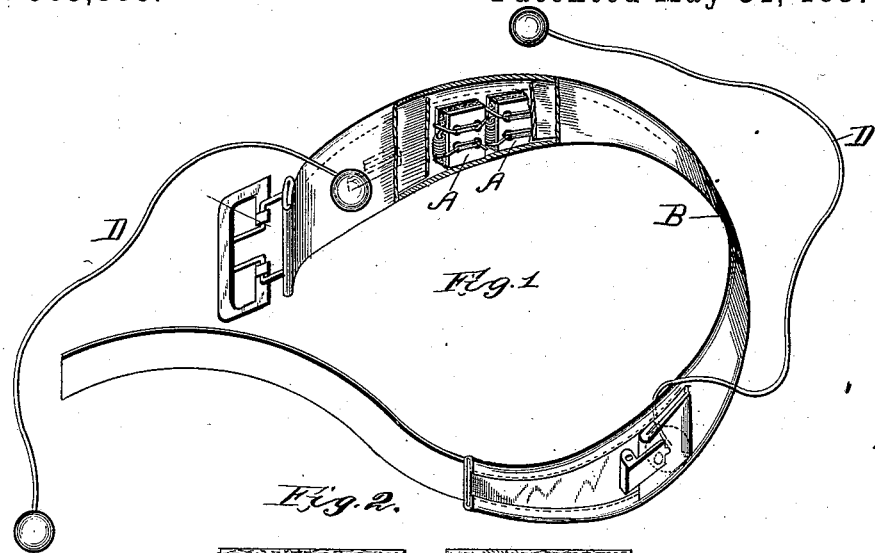
Fig. 1.
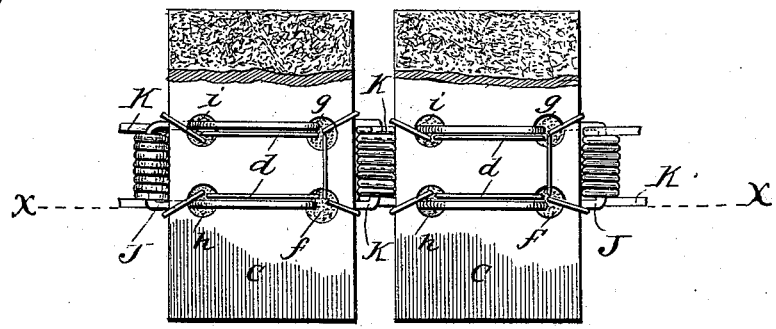
Fig. 2.
Fig. 3.
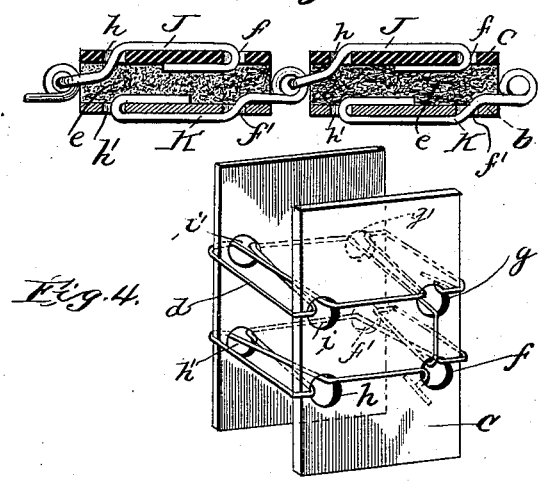
Fig. 4.
Witnesses
R. C. Laurie
Sarepta Specht
Inventor
Wilson W. Dunlap
By his Attorneys
R. S. & A. P. Lacey

UNITED STATES PATENT OFFICE.

WILSON W. DUNLAP, OF OSKALOOSA, IOWA.

ELECTRIC BELT.

SPECIFICATION forming part of Letters Patent No. 363,886, dated May 31, 1887.

Application filed January 12, 1887. Serial No. 224,135. (No model.)

*To all whom it may concern:*

Be it known that I, WILSON W. DUNLAP, a citizen of the United States, residing at Oskaloosa, in the county of Mahaska and State of Iowa, have invented certain new and useful Improvements in Electric Belts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to electric body-wear; and it consists in the novel features, more fully hereinafter set forth, claimed, and shown in the annexed-drawings, in which—

Figure 1 is a perspective view, parts broken away, of an electric belt embodying my invention; Fig. 2, a plan view of two cells, on an enlarged scale; Fig. 3, a sectional view of the cells on the line X X of Fig. 2; and Fig. 4, a detail perspective, parts broken away, of a cell showing the manner of securing the elements together by non-conducting strands.

The battery is composed of a series of cells, A, hinged together, so that the battery can be folded or rolled up in small compass. The cells comprise zinc, $b$, and copper, $c$, plates held together by the non-conducting strands $d$. The plates have an absorbent filling, $e$, interposed between them, and the three—the two plates and the filling—are bound together by the strand $d$, which passes through four openings, $f\ g\ h\ i$, in the plate $c$, and corresponding openings, $f'\ g'\ h'\ i'$, in the plate $b$ and around the plates. The openings are formed in pairs, and each pair of openings is located near the opposite edges of the plates, as shown. The strand $d$, starting from the opening $g$, passes down through the opening $g$, around over the edges of the plates, down through the openings $g'\ g$, around over the edges, and back up through the openings $i\ i'$, across the plate $b$, down through openings $i\ i'$, across the plate $c$, down through openings $g\ g'$, then over to the opening $f$, up through openings $f\ f'$, around the edges of the plates, and again up through the same openings $f\ f'$, over the plate $c$, down through openings $h'\ h$, around the opposite edges of the plates, and back through the openings $h\ h'$, and over plate $b$, and up through the opening $f$, as shown most clearly in Fig. 4. The opposite ends of the strand are fastened in any suitable manner between the plates, preferably by passing them through the filling material, so that they will be invisible.

The cells are united in series by wires J and K, which are secured to their respective plates by having their ends, which extend parallel to each other, passed between the plates and through the nearer openings, and over the plates and through the farther or opposite openings, and clinched upon the inner sides of the plates, as shown. The middle portion of the wires projects beyond the edges of the plates, and the one is formed into a coil and the other is left straight, and when a number of such cells are placed together the end of the cell having the coil is opposite to the end of the cell having the straight wire, which straight wire is fitted within said coil, thereby making a perfect electrical connection which will bend as a hinge and cannot become disconnected. The end cells have loops projecting which are the poles of the battery, and serve to secure them to the belt B, which is open from end to end, forming a pocket, in which the battery is placed. The opening through the belt is lined with a suitable non-absorbent material. The hooks at each end of the belt are connected with plates, which are designed to rest against the body of the wearer.

The conductors D—two in number, one leading from each terminal of the battery—are for conveying the current from the belt to any part of the body, as to the ankle, knee, head, &c., or can be used to conduct the current to any desired point, as will be readily understood.

Having thus described my invention, what I claim, and desire to secure by Letters Patent, is—

The combination of the series of cells, each cell composed of plates of opposite polarity, and having corresponding pairs of openings near each edge, the wires having their ends passed between the plates and out through the nearer pairs of openings and in through the opposite pairs of openings and clinched upon their respective plates, said wires having their ends projecting beyond the edges of the plates and having one end coiled about the other end of the adjacent cell, as shown, and the strand or non-conducting material uniting the plates, substantially as shown.

In testimony whereof I affix my signature in presence of two witnesses.

WILSON W. DUNLAP.

Witnesses:
J. L. DUNLAP,
M. A. DUNLAP.